J. I. Brinkerhoff,
Potato Digger.
No. 87,536.    Patented Mar. 9, 1869.
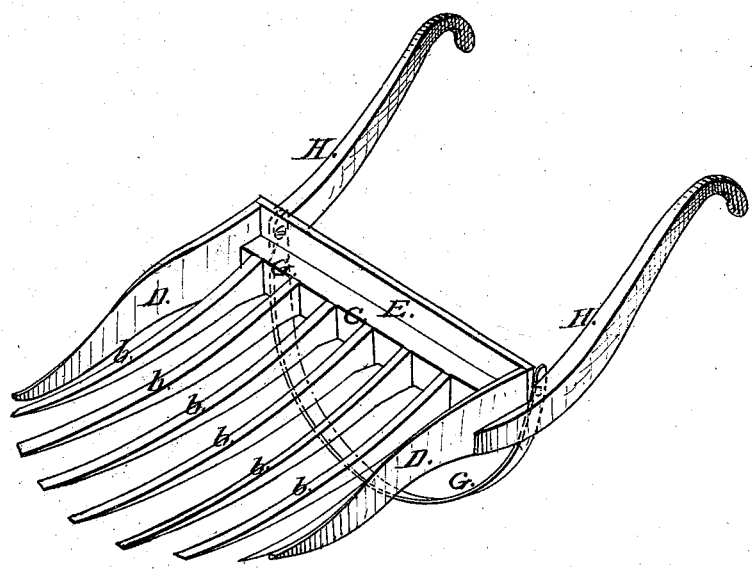
Witnesses:
John A. Ellis.
J. W. White.
Inventor:
J. I. Brinkerhoff
Per
D. H. Alexander
Attorney

JOHN I. BRINKERHOFF, OF AUBURN, NEW YORK.

Letters Patent No. 87,536, dated March 9, 1869.

IMPROVEMENT IN POTATO-DIGGER.

The Schedule referred to in these Letters Patent and making part of the same.

*To all whom it may concern:*

Be it known that I, JOHN I. BRINKERHOFF, of Auburn, in the county of Cayuga, and State of New York, have invented certain new and useful Improvements in Potato-Diggers; and I do hereby declare that the following is a full, clear, and exact description thereof, reference being had to the accompanying drawings, and to the letters of reference marked thereon, which form a part of this specification, and in which is represented a perspective view of my potato-digger.

The nature of my invention consists in constructing a potato-digger, in the manner hereinafter described, and furnished with a semicircular bar of metal, the ends of which are pivoted to said handles, and intended to answer the twofold purpose of acting as a fulcrum, to support the prongs of the digger in a horizontal position, and also of allowing a lateral motion to the prongs, to sift out the dirt from the potatoes.

In the accompanying drawing—

*b b b* represent the prongs of the digger, which are permanently fastened to the cross-bar C.

D D represent the two guards, attached to opposite ends of bar C, and designed to prevent the dirt and potatoes from escaping at the sides of the digger.

Behind the bar C is secured the beam E, which will prevent the dirt and potatoes from falling out at the back of the digger, when said digger is raised to a horizontal position.

To the outside of the guards D D, the handles F F are secured.

G represents a semicircular bar of metal, the ends of which are pivoted to the inside of the handles H H.

In operating my machine, it will be seen that when the prongs *b b b* are placed in a position to penetrate the potato-hill, the bar G will lie on the surface of the earth, and then, by elevating the handles F F, the bar G will assume a perpendicular position, and answer as a fulcrum for raising the digger to the height required to sift out the dirt from the digger.

The sifting-process can be carried by two motions, first, a side, and, secondly, an up-and-down motion, which will speedily separate the dirt from the potatoes.

It will be seen, that owing to the circular form of the bar G, the potatoes can be discharged to the right or left, by elevating one or the other of the handles, as the case may be.

Having thus described my invention,

What I claim as new, and desire to secure by Letters Patent, is—

1. The semicircular bar G, or its equivalent, when attached and operated substantially in the manner and for the purpose herein set forth.

2. The combination of the bar G, with handles F F, when constructed and operated in the manner described.

In testimony that I claim the foregoing as my own I affix my signature, in presence of two witnesses.

JOHN I. BRINKERHOFF.

Witnesses:
HORACE T. COOK,
H. V. QUICK.